(12) United States Patent
Macri et al.

(10) Patent No.: US 7,415,979 B1
(45) Date of Patent: *Aug. 26, 2008

(54) BARBEQUE GRILL WITH REMOVABLE HANDLE

(75) Inventors: Gregory G Macri, Elkhart, IN (US); Darren L Eby, Bristol, IN (US)

(73) Assignee: ASC Industries, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/195,948

(22) Filed: Aug. 3, 2005

(51) Int. Cl.
*F24C 15/30* (2006.01)
(52) U.S. Cl. .................. 126/9 R; 126/25 R; 126/304 R; 126/40; 126/41 R; 126/50
(58) Field of Classification Search ............. 126/25 R, 126/41 R, 40, 50; D7/393, 394, 549, 546, D7/543, 705, 622, 360, 367; 220/759; 16/406, 16/422, 424, 425; 248/145.6; 294/27.1
See application file for complete search history.

(56) References Cited

U.S. PATENT DOCUMENTS

| | | | |
|---|---|---|---|
| 759,435 A | | 5/1904 | Greeley |
| 1,785,438 A | * | 12/1930 | Edlin .................... 126/261 |
| 2,666,425 A | | 1/1954 | Hastings, Jr. |
| 2,912,972 A | | 11/1959 | Leyen |
| 2,922,414 A | | 1/1960 | Brender |
| 3,032,783 A | | 5/1962 | Swanson, Jr. |
| 3,060,920 A | | 10/1962 | Dilbert |
| 3,215,063 A | * | 11/1965 | Olson et al. ............... 99/425 |
| 3,266,478 A | | 8/1966 | Booth |
| 3,285,239 A | | 11/1966 | Drake |
| 3,306,280 A | | 2/1967 | Vannoy |
| 3,452,736 A | | 7/1969 | Harff et al. |
| 3,503,324 A | | 3/1970 | Gmeiner |

(Continued)

FOREIGN PATENT DOCUMENTS

DE 24 29 839 * 6/1974

(Continued)

OTHER PUBLICATIONS

Trademark Electronic Search System printout for mark CAR-B-Q; Registration No. 2,775,590, registered Oct. 21, 2003.

(Continued)

*Primary Examiner*—Carl D Price
(74) *Attorney, Agent, or Firm*—Van, Dyke, Gardner, Linn & Burkhart, LLP

(57) ABSTRACT

A barbeque grill unit is provided with at least one removable handle that is readily removed and attached to the grill body to provide a grill unit having a reduced overall length when the removable handle is detached, thus promoting the convenient packing, shipping, storing, and use of the barbeque grill unit. In one embodiment, the cooking equipment apparatus comprises a grill body having an outer surface and an interior and at least one removable handle adapted for selective attachment with the grill body to facilitate handling of the cooking equipment apparatus. A first coupling member is located on the outer surface of the grill body and a second coupling member is located on the handle, with the first and second coupling members adapted to being selectively engaged such that the handle is attached with the grill body.

23 Claims, 7 Drawing Sheets

U.S. PATENT DOCUMENTS

| | | | |
|---|---|---|---|
| 3,536,060 A | 10/1970 | Block et al. | |
| 3,605,718 A | 9/1971 | Winters | |
| 3,685,092 A * | 8/1972 | Cook | 220/759 |
| 3,692,351 A | 9/1972 | Christopher et al. | |
| 3,753,431 A | 8/1973 | Koziol | |
| 3,806,987 A | 4/1974 | Koziol | |
| 3,831,002 A * | 8/1974 | Mysicka et al. | 219/432 |
| 3,843,082 A | 10/1974 | Garrett | |
| 3,956,792 A * | 5/1976 | Fischbach | 220/759 |
| 4,089,554 A | 5/1978 | Myers | |
| 4,143,902 A | 3/1979 | Johnstone | |
| 4,325,294 A | 4/1982 | Hammond | |
| 4,347,830 A | 9/1982 | Runyan | |
| 4,518,189 A | 5/1985 | Belt | |
| 4,592,335 A | 6/1986 | Beller | |
| 4,729,535 A | 3/1988 | Frazier et al. | |
| 4,794,666 A * | 1/1989 | Kim | 220/753 |
| 4,893,609 A | 1/1990 | Giordani et al. | |
| 5,029,935 A | 7/1991 | Dufrancatel | |
| 5,033,448 A | 7/1991 | Sandweg | |
| 5,165,384 A | 11/1992 | Knutson | |
| 5,178,126 A | 1/1993 | Beller | |
| 5,188,089 A | 2/1993 | Hamilton | |
| 5,263,467 A | 11/1993 | Jones | |
| 5,310,147 A | 5/1994 | Billman | |
| 5,373,608 A * | 12/1994 | Welch | 16/425 |
| 5,394,590 A | 3/1995 | Yu | |
| 5,411,011 A | 5/1995 | Teta | |
| 5,472,164 A | 12/1995 | Contee, Jr. | |
| 5,499,573 A | 3/1996 | Lin | |
| 5,586,546 A | 12/1996 | Ashcraft et al. | |
| 5,626,126 A | 5/1997 | McNulty | |
| 5,640,949 A | 6/1997 | Smith | |
| 5,673,458 A * | 10/1997 | Raoult | 16/425 |
| 5,878,739 A | 3/1999 | Guidry | |
| 5,950,617 A | 9/1999 | Lorenz | |
| 5,967,134 A | 10/1999 | Harris | |
| 6,035,800 A | 3/2000 | Clifford | |
| 6,125,838 A | 10/2000 | Hedgpeth | |
| 6,196,115 B1 * | 3/2001 | Tsao | 99/339 |
| 6,263,867 B1 | 7/2001 | Skelton | |
| 6,354,286 B1 | 3/2002 | Davis | |
| 6,357,344 B2 | 3/2002 | O'Grady et al. | |
| 6,637,426 B2 | 10/2003 | Champlin | |
| 7,284,549 B1 * | 10/2007 | Eby et al. | 126/9 R |
| 2001/0042545 A1 | 11/2001 | Robin | |
| 2003/0024523 A1 | 2/2003 | Ching-Hui | |

FOREIGN PATENT DOCUMENTS

| | | | |
|---|---|---|---|
| DE | 32 18 853 | * | 5/1982 |
| DE | 36 27 229 | * | 8/1986 |
| GB | 199584 | | 6/1923 |
| GB | 226979 | | 1/1925 |
| GB | 2 041 212 | * | 9/1980 |
| JP | 2001-190433 | * | 7/2001 |

OTHER PUBLICATIONS

Photos of ASC Industries Portable Gas Grill. On sale or publicly available more than one year prior to the filing of the present application.

Web page (vitco.com) printout of portable grill. On sale or publicly available more than one year prior to the filing of the present application.

Web page (myrvq.com) printout of portable grill. On sale or publicly available more than one year prior to filing of the present application.

Kingsford portable grill. On sale or publicly available more than one year prior to the filing of the present application.

Weber "Gas Go-Anywhere" portable grill. On sale or publicly available more than one year prior to the filing of the present application.

Weber "Charcoal Go-Anywhere" portable grill. On sale or publicly available more than one year prior to the filing of the present application.

Picture of a portable grill. On sale or publicly available more than one year prior to the filing of the present application.

Web page (supergrills.com) printout of deluxe portable gas grill. On sale or publicly available more than one year prior to the filing of the present application.

Web page (supergrills.com) printout of deluxe portable grills. On sale or publicly available more than one year prior to the filing of the present application.

Web page (supergrills.com) printout of "Artic Treasure Chest Portable Gas Grill". On sale or publicly available more than one year prior to Aug. 3, 2005.

Web page (cajun-outdoor-cooking.com) printout of "Artic Square Suitcase Deluxe Portable Charcoal Grill". On sale or publicly available more than one year prior to Aug. 3, 2005.

Web page (cajun-outdoor-cooking.com) printout of "Artic Portable Table Top Porcelain Gas Grill". On sale or publicly available more than one year prior to to Aug. 3, 2005.

Web page (apatiooulet.com) printout of "Deluxe Portable BBQ Grill". On sale or publicly available more than one year prior to the filing of the present application.

Picture of a Thermos brand portable grill. On sale or publicly available more than one year prior to the filing of the present application.

Web page (apatiooulet.com) printout of "Porta-Chef LP Grill". On sale or publicly available more than one year prior to the filing of the present application.

Web page (outdoor-recreation.aubuchonhardware.com) printout of "Portable Gas Table Top Grill". On sale or publicly available more than one year prior to Aug. 3, 2005.

Web page (bbqpeople.com) printout of portable "Charcoal Grill" and portable "Propane Grill". On sale or publicly available more than one year prior to Aug. 3, 2005.

Web page (flamingbarbecues.co.uk) printout of "Outback Gas Weekender". On sale or publicly available more than one year prior to the filing of the present application.

Web page (flamingbarbecues.co.uk) printout of "Lifestyle Table Top Barbeque". On sale or publicly available more than one year prior to the filing of the present application.

Web page (grill4all.com) printout of "Grill-4-All System". On sale or publicly available more than one year prior to the filing of the present application.

Web page (grill4all.com) printout of "Stainless Steel Portable Propane Grill". On sale or publicly available more than one year prior to Aug. 3, 2005.

Web page (rvlifestyles.net) printout of "BBQ Grill/Smk. Plate". On sale or publicly available more than one year prior to the filing of the present application.

Frontgate Catalogue (2003), "Portable Stainless Steel Grill". On sale or publicly available more than one year prior to the filing of the present application.

Lillian Vernon Favorites Catalogue, "George Foreman Portable Gas Grill". On sale or publicly available more than one year prior to the filing of the present application.

Web page (lillianvernon.com) printout of "George Foreman Portable Gas Grill". On sale or publicly available more than one year prior to the filing of the present application.

Bart's Watersports Catalog, "Sports Extreme BBQ/Stove Oven" and "Sport Supreme Grill/Oven". On sale or publicly available more than one year prior to Aug. 3, 2005.

Web page (bartswatersports.com) printout of "Sport Supreme Propane Barbeque Grill/Oven". On sale or publicly available more than one year prior to Aug. 3, 2005.

Web page (sportbbq.com) printout of "Party Size Sport Supreme Deluxe Propane BBQ Grill and Oven". On sale or publicly available more than one year prior to Aug. 3, 2005.

Web page (sportbbq.com) printout of accessories for Sport Barbeques. On sale or publicly available more than one year prior to the filing of the present application.

Web page (rvpartstore.com) printout of "Portable Gas Barbeque Grill". On sale or publicly available more than one year prior to the filing of the present application.

Photos of RVQ Portable Gas Grill. On sale or publicly available more than one year prior to the filing of the present application.

Photos of Thermos Portable Gas Grill. On sale or publicly available more than one year prior to the filing of the present application.

Photos of Grand Gourmet Portable Gas Grill. On sale or publicly available more than one year prior to the filing of the present application.

Photos of Uniflame Portable Gas Grill. On sale or publicly available more than one year prior to the filing of the present application.

Photos of BBQ Pro Portable Gas Grill. On sale or publicly available more than one year prior to the filing of the present application.

Photos of Weber Portable Gas Grill. On sale or publicly available more than one year prior to the filing of the present application.

Photos of Olympian 4100 Portable Gas Grill. On sale or publicly available more than one year to the filing of the present application.

Photos of Freedom Deluxe Gas BBQ Grill. On sale or publicly available more than one year prior to the filing of the present application.

Photos of Grill4All Portable Gas Grill. On sale or publicly available more than one year prior to the filing of the present application.

Printouts of Thumbnails of Portable Gas Grills. On sale or publicly available more than one year prior to the filing of the present application.

* cited by examiner

BARBEQUE GRILL WITH REMOVABLE HANDLE

FIELD OF THE INVENTION

The present invention is directed to cooking equipment apparatuses and, in particular, portable grilling devices.

BACKGROUND OF THE INVENTION

The grilling of food is a popular method of food preparation, particularly in a recreational setting. Outdoor grilling is particularly popular in the summer time as a way to avoid introducing additional heat into an interior of a living environment as well as itself being a recreational activity. Further, outdoor grilling is often done at parks and campgrounds, as it is a convenient means of food preparation at locations that are away from normal residential areas. Portable grills are often used in such remote locations, as they are readily transportable as opposed to large, residential outdoor style grills. The demand for portable grilling methods is evidenced by the great many portable grills that exist in the marketplace. Examples of portable grills can be seen in U.S. Pat. No. 3,753,431 issued to Koziol, U.S. Design Pat. No. D282,619 issued to Fitzgerald, U.S. Design Pat. No. D461,360 issued to Bossler and in the Webber® Go-Anywhere® line of grills. Previously, people have used utensils to lift and open the lids of barbeque grills in order to avoid touching the hot handles. These lifting utensils do not normally remain coupled to the grill when not being held by the user.

SUMMARY OF THE INVENTION

The present invention provides a barbeque grill with at least one removable handle that is readily removed and attached to the grill body. In the preferred form the barbeque grill provides a grill unit having a reduced overall length when the removable handle is detached, thus promoting the convenient packing, shipping, storing, and use of the barbeque grill unit.

According to one preferred aspect of the present invention, a cooking equipment apparatus comprises a grill body having an outer surface and an interior and at least one removable handle adapted for selective attachment with the grill body to facilitate handling of the cooking equipment apparatus. A first coupling member is located on the outer surface of the grill body and a second coupling member is located on the handle, with the first and second coupling members adapted to being selectively engaged such that the handle is attached with the grill body.

The ability to readily reduce the overall length of the barbeque grill unit is beneficial in that it enables the grill unit to be disassembled into a compact form and thus reduces handling costs associated with the supply chain of the barbeque grill unit. For example, shipping costs may be significantly reduced, particularly in regard to overseas production, by increasing the number of barbeque grill units that may be packed within a given shipping container. Similarly, a distributor, wholesaler, and/or retailer will be able to inventory a given quantity of barbeque grill units utilizing less storage space. The reduced costs thus provides a competitive advantage to the barbeque grill unit supplier while the ability of a distributor, wholesaler, retailer, or purchaser to readily assemble the handle and grill body of the present invention without the need for intricate assembly skills or numerous tools provides customer satisfaction. Furthermore, the readily assembled and disassembled removable handle and grill body of the present invention provide a convenient barbeque grill unit for individuals desiring to transport the grill unit for use in locations remote from normal residential areas, such as individuals engaging in camping and picnicking.

These and other objects, advantages, purposes, and features of the present invention will become apparent upon review of the following specification in conjunction with the drawings.

DESCRIPTION OF THE PREFERRED EMBODIMENTS

Figure 1:
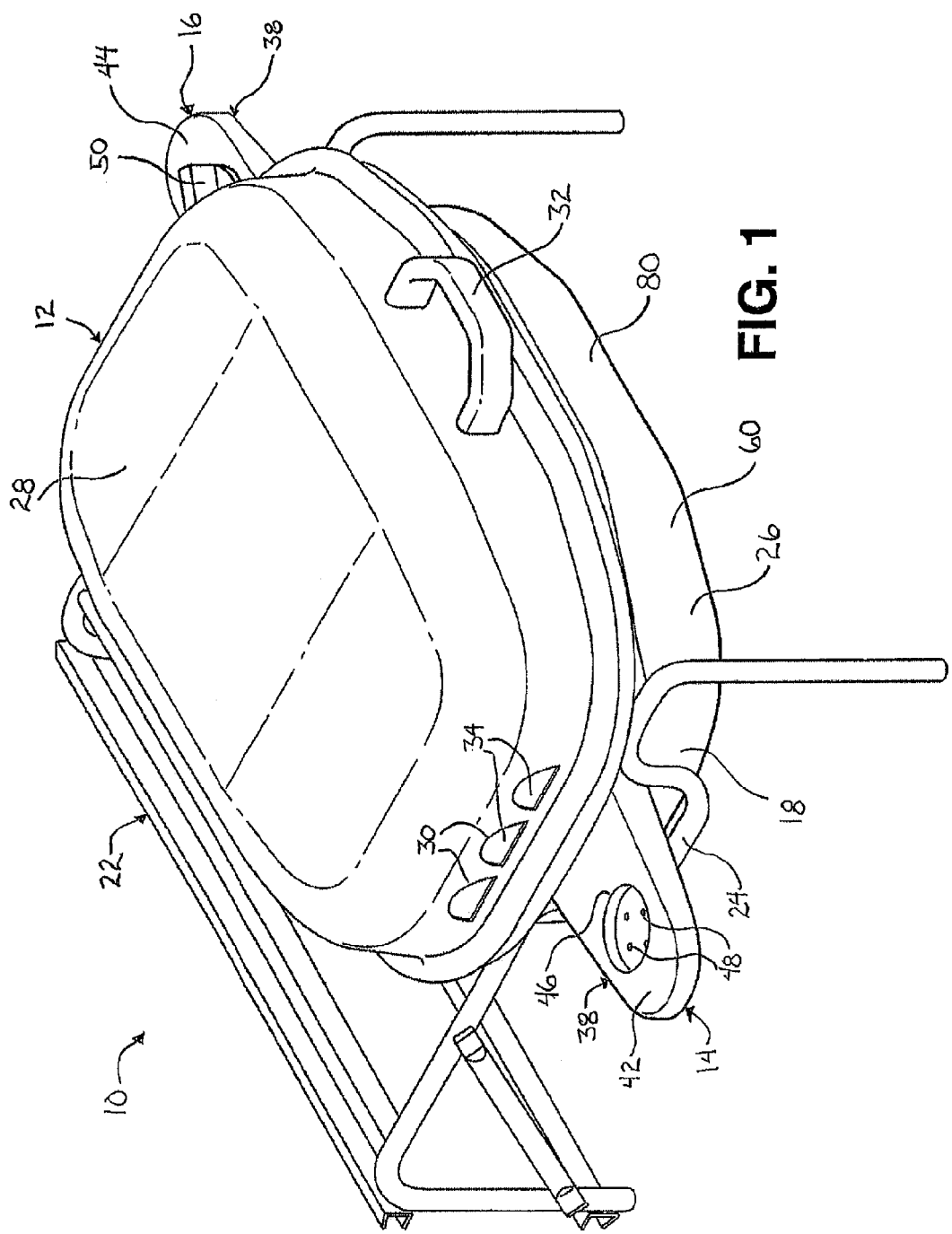
FIG. 1 is a front perspective view of a cooking equipment apparatus with removable handles of the present invention embodied as a portable barbeque grill held within a support stand.

The present invention is embodied in a cooking equipment apparatus, a preferred embodiment of which is a portable barbeque grill unit shown in FIG. 1 and identified by reference numeral 10. As illustrated, portable barbeque grill unit 10 includes a cooking or grill body 12 having left and right removable handles or side elements or support arms 14, 16 attached to grill body 12, with handles 14, 16 extending laterally from sides 18, 20 of grill body 12. Notably, handles 14, 16 are readily selectively removable from and securable to grill body 12. Preferably handles 14, 16 are selectively coupled to grill body 12 so as to remain coupled when handles 14, 16 are not being held, but are readily removable when desired. Attachment of removable handles 14, 16 provides for the convenient movement or handling of portable barbeque grill unit 10, particularly so when grill body 12 is hot from being used to grill food. Removal of handles 14, 16 may prevent the handles from becoming heated during grilling. Furthermore, when removable handles 14, 16 are removed, the overall length of portable barbeque grill unit 10 is significantly reduced. The ability to readily reduce the overall length of barbeque grill unit 10 is notably beneficial in that it enables portable barbeque grill unit 10 to be disassembled into a compact form requiring less room for storage, shipping, handling, or the like.

In the embodiment of FIG. 1, portable barbeque grill unit 10 is shown with grill body 12 mounted or held within support stand 22. Support stand 22 may be mounted on a vertical wall surface, such as a fixed wall or wall of a vehicle, or may alternatively support grill body 12 on a horizontal surface, such as the ground or table. Portable barbeque grill unit 10 is therefore readily interchangeable between a wall mounted grill and a table or ground supported grill without requiring multiple independent stands or supports. FIG. 1 also discloses the inclusion of offset region 24 on support stand 22 for receiving left removable handle 14. Although not shown, support stand 22 includes a similar offset region for receiving right removable handle 16. As described in more detail below, however, an alternative cooking equipment apparatus having one or more removable handles may be constructed for use without a support stand and still function as intended within the scope of the present invention.

With the exception of removable handles 14, 16 and the associated structure therewith described below, the grill body 12 and support stand 22 described herein may be substantially similar to the grill bodies and support stands described in U.S. patent application Ser. No. 10/864,542 filed on Jun. 9, 2004 and now issued as U.S. Pat. No. 7,284,549, which is hereby incorporated herein by reference in its entirety. Because the grill body and support stand are described in the application referenced above, the following discussion will focus primarily on the removable handles 14, 16 and associated structure, with further alternatives or description being provided below.

Figure 2:
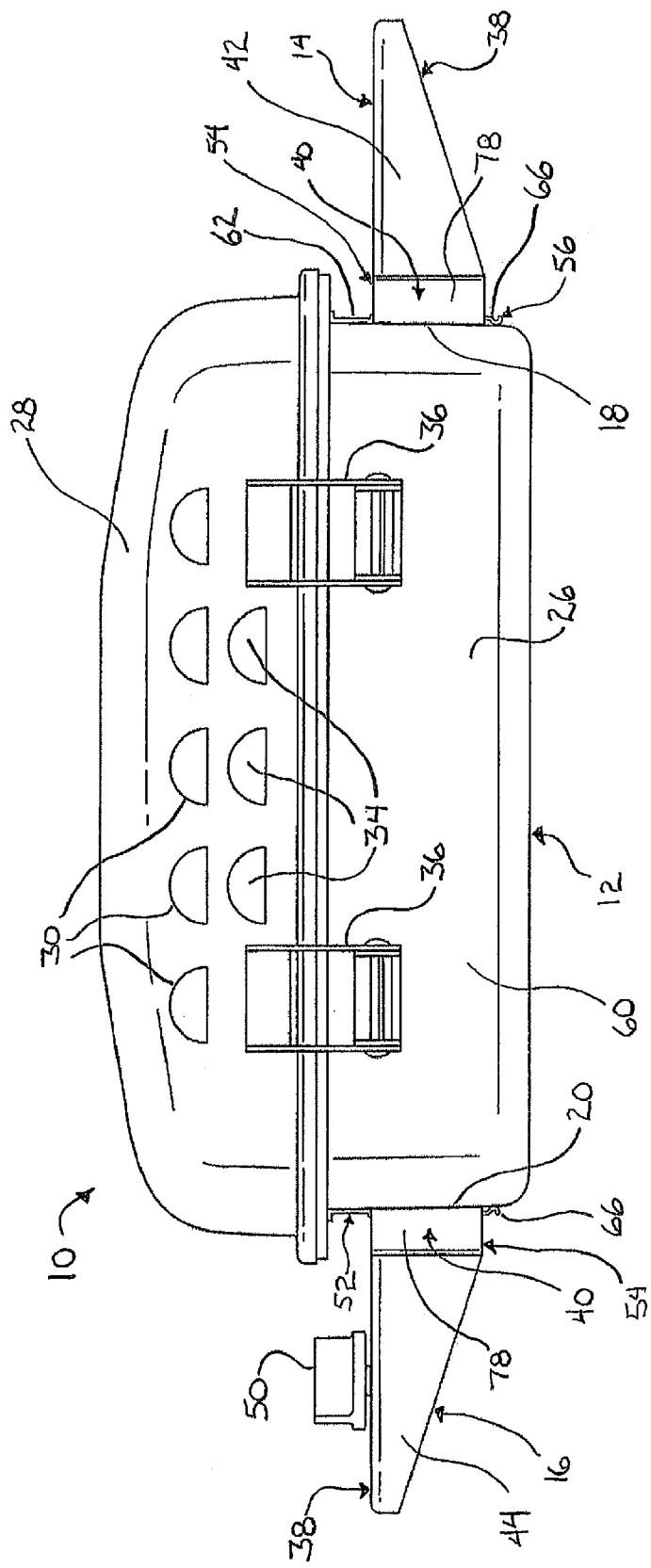
FIG. 2 is a rear elevation of the portable barbeque grill of FIG. 1 shown removed from the support stand.

Referring now to FIGS. 1 and 2, grill body 12 is shown to further include a lower section or lower half 26 and an upper section or upper half or lid 28 having vents 30, with lid 28 mating with lower section 25 in clamshell fashion. As shown, left and right removable handles 14, 16 are attached to and extend from lower section 26. Grill body 12 also includes a handle 32 for raising and lowering the grill lid 28 to access the interior or cooking area 34 of grill body 12, and hinges 36 that pivotably connect grill lid 28 to lower section 26. Although not shown, grill body 12 includes an internal cooking grid or grill surface and internal fuel spreaders or diffusers of conventional design which are used as the internal cooking elements of the grill. Grill body 12 may also include a fire starting mechanism.

In the embodiment of FIGS. 1 and 2, left and right removable handles 14, 16 are constructed to include a handle body 38 and an insert member or plug member 40, insert member 40 being described in detail below. The handle body 38 of left removable handle 14 is disclosed as a beverage support arm 42 and the handle body 38 of right removable handle 16 is disclosed as a gas valve support arm 44. Beverage support arm 42 includes beverage detent 46 adapted to support a beverage container, such as a standard 12 oz. can, and includes drain holes 48 to allow condensation or spillage to drain. It should be understood that left removable handle 14 may also be used to support cooking ingredients, such as seasoning salts and barbeque sauce, or may include alternatively configured detents or apertures, or may even omit detents and/or apertures, and still function as a side element within the scope of the present invention. The handle bodies 38 are preferably constructed of a polymeric material and are formed by molding. However, handle bodies may alternatively be constructed of a metallic material or wood material, or a combination of materials, and still function as intended, and may also be formed by stamping, milling, or another alternative process.

Gas valve support arm 44, as shown, supports regulator control valve knob 50 used to adjust a standard regulator valve (not shown) to control the amount of fuel, such as gasified liquid propane, supplied to grill body 12 through a fuel supply connector (not shown). The cooking fuel may be supplied to the standard regulator valve either by a flexible hose (not shown), or by a canister of cooking fuel (not shown) mounted thereto. The flexible hose supply line may be coupled to a conventional fuel supply, such as the fuel supply bottles that are mounted on the exterior of a trailer tongue, recreational vehicle exterior wall, or separately transportable fuel supply tanks. Alternatively, the flexible hose may be connected to an exterior fuel supply bottle directly or alternatively through additional extension lines through a vehicle wall to the exterior fuel supply. The connection of the fuel supply hose to the regulator valve may be of the quick-connect design, a threaded connection, or the like.

Although both left and right handles 14, 16 of portable barbeque grill unit 10 are disclosed as being removable, it should be appreciated that portable barbeque grill unit 10 may be alternatively constructed and still function as intended within the scope of the present invention. For example, only either the left or the right handle could be constructed to be removable, with the handle body of the removable handle being either a beverage support arm, a gas valve support arm, or of an alternative configuration. Furthermore, more than two removable handles may be provided, such as a removable handle on each side of a portable barbeque grill.

Figure 3:
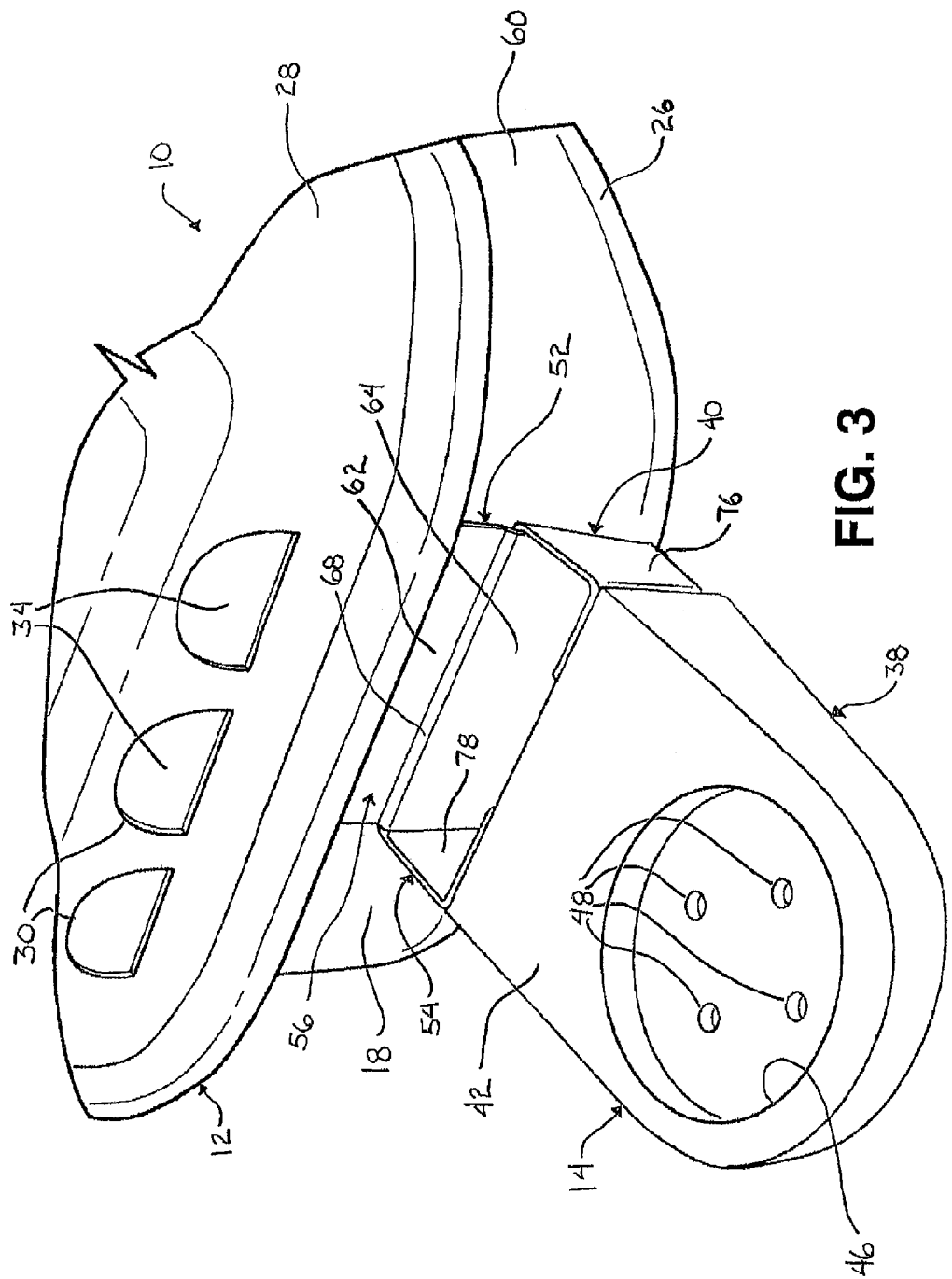
FIG. 3 is a close up front perspective view of the left removable handle attached to the grill body of the portable barbeque grill of FIG. 1.
Figure 4:
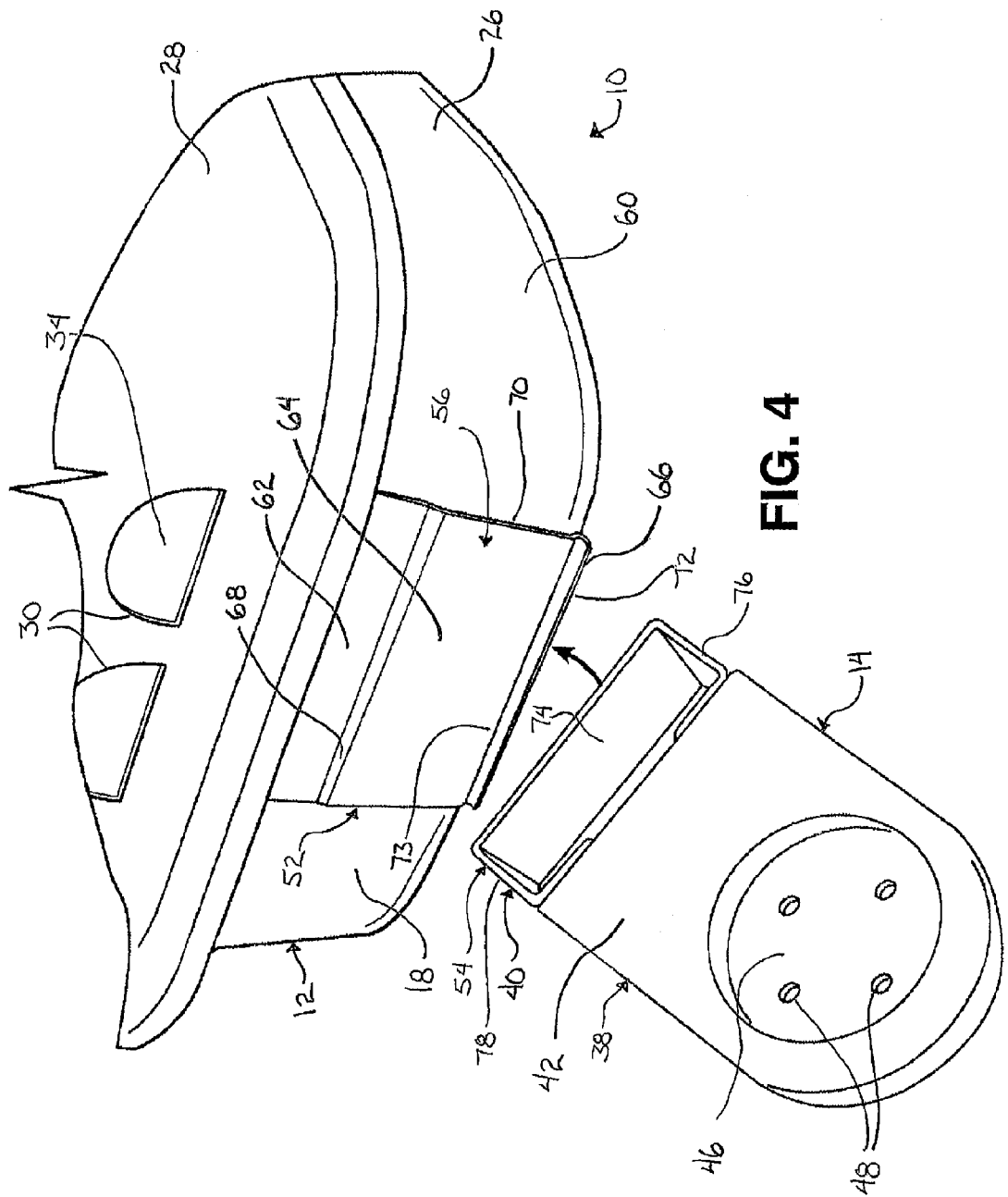
FIG. 4 is a perspective view of the left removable handle removed from the grill body of FIG. 3.
Figure 5:
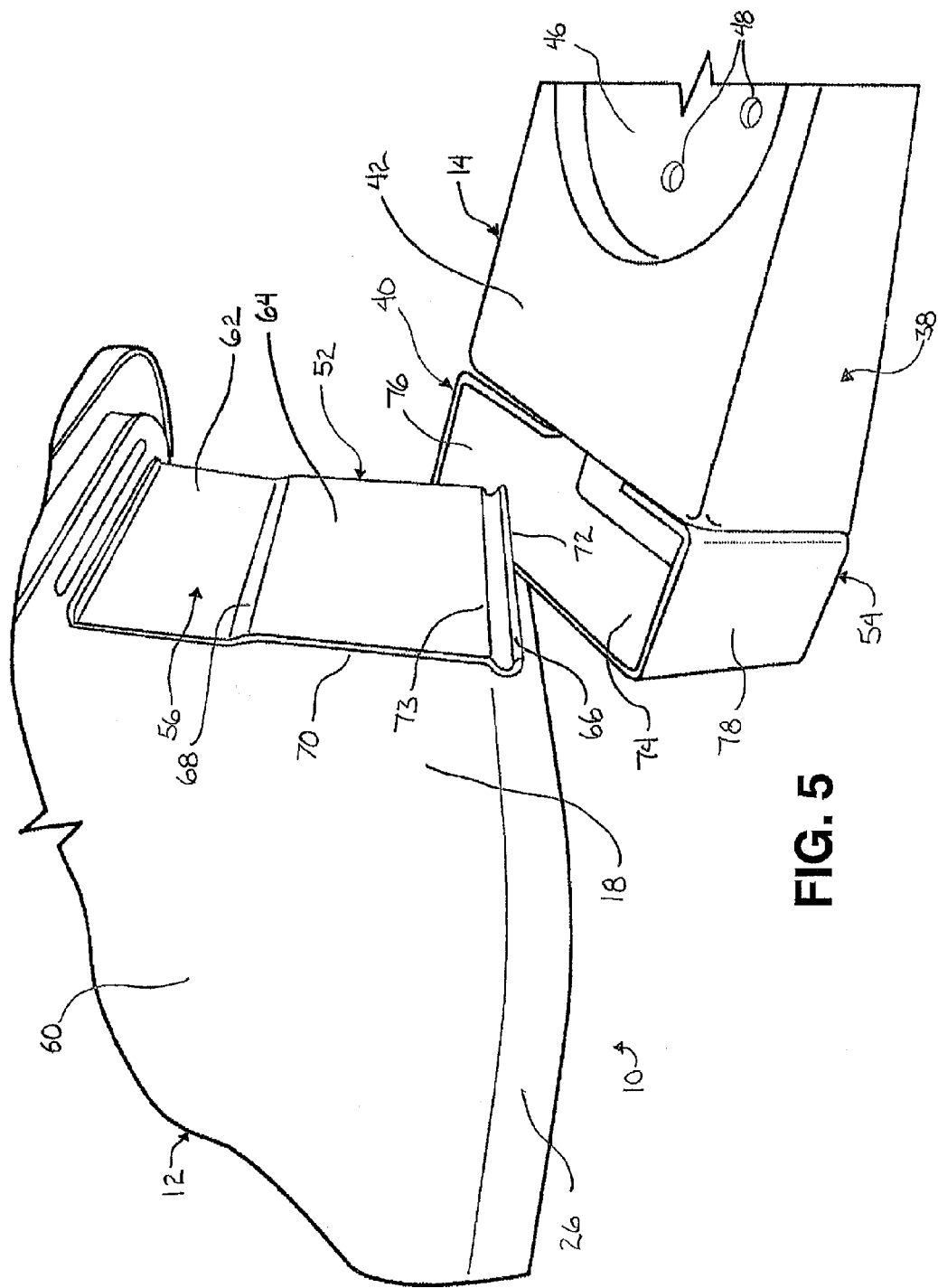
FIG. 5 is a rear perspective view of the left removable handle and grill body of FIG. 3 shown in partial engagement.

Referring now to FIGS. 3 to 5, an embodiment of left removable handle 14 and grill body 12 is disclosed. Right removable handle 16 may be constructed to be substantially similar to left removable handle 14, therefore, the following discussion focuses on left removable handle 14 with the alternatives or differences in regard to right removable handle 16 being discussed below. As illustrated, first and second coupling members or attachment members 52, 54 are used to selectively attach removable handle 14 to grill body 12. In the embodiment shown, first coupling member 52 is a receptacle member or receiver member or clip member 56 and second coupling member 54 is an insert member or plug member 40, where receptacle member 56 is adapted to receive insert member 40 for attachment of removable handle 14 with grill body 12.

The illustrated embodiment of receptacle member 56, as disclosed in FIGS. 3 to 5, is located on or attached to the outer surface 60 of lower section 26 of grill body 12. Receptacle member 56 is shown to be of unitary construction and includes an attachment flange 62, a retainer flange 64, and a retainer lip 66. Attachment flange 62 is formed as a generally planar metallic member conforming to the profile of side of lower section 26 of grill body 12 and may be secured to outer surface 60 of lower section 26 by welding, such as by tack welding or spot welding. It should be understood, however, that the attachment flange 62 may be constructed of an alternative material or secured to grill body in an alternative manner. For example, an attachment flange could be constructed of a wood material or a polymeric material, and/or could be secured to an outer surface 60 of the grill body 12 by adhesives, mechanical fasteners, or the like.

Retainer flange 64 extends from and is attached to attachment flange 62 by angled portion 68 such that it is disposed apart or a distance from the outer surface 60 of grill body 12 in a cantilevered fashion. Retainer flange 64 is also preferably formed as a generally planar metallic member and, due to its cantilever construction, is able to flex in a spring like manner. A retainer gap 70 is formed between the lower section 26 and retainer flange 64 which, as described in more detail below, is adapted to receive insert member 40 such that receptacle member 56 and insert member 40 cooperatively function to attach removable handle 14 to grill body 12. Similar to attachment flange 62 above, retainer flange 64 may also be constructed of alternative materials. For example, an alternative retainer flange could be constructed of a wood material or a polymeric material. Furthermore, if the retainer flange and attachment flange were constructed as separate components, the retainer flange and attachment flange could be secured together in an alternative manner, such as, for example, by welding, adhesives, fasteners, or the like.

Retainer lip 66, in the illustrated embodiment, is formed to be a generally semicircular or a rounded half-cylindrical member extending from retainer flange 64 and is located at an insertion end 72 of receptacle member 56. Retainer lip 66 functions to support or hold the end 73 of retainer flange 64 opposite angled portion 68 above grill body 12 with regard to any propensity of retainer flange 64 coming into contact with grill body 12 due to the spring-like cantilevered characteristic of retainer flange 64. As described in more detail below, retainer lip 66 also functions to retain at least a portion of insert member 40 within retainer gap 70 when receptacle member 56 receives insert member 40.

Retainer lip 66, due to the unitary construction of the illustrated receptacle member 56 as noted above, is thus also constructed of a metallic material. It should be appreciated, however, that an alternative retainer lip could be constructed within the scope of the present invention and still function as intended. For example, a retainer lip could be constructed of a polymeric material, or a wood material. Furthermore, if the retainer lip were constructed as a separate piece, the retainer clip could be affixed to the retainer flange by welding, adhesives, fasteners, or the like.

Insert member 40 of left removable handle 14, as illustrated in FIGS. 3 to 5, is preferably constructed as a unitary metallic structure that includes an insert bracket or insert element 74 and first and second legs 76, 78. First and second legs 76, 78 function to secure insert member 40 to handle body 38, with handle body 38 and first and second legs 76, 78 being attached by fasteners, adhesives, or the like. Insert bracket 74, in the embodiment illustrated, is generally planar and extends between first and second legs 76, 78. Although disclosed as being constructed as a separate metallic structure and secured to handle body 38 of left removable handle 14, left removable handle 14 may be alternatively constructed and still function as intended within the scope of the present invention. For example, a removable handle could be constructed wherein the insert member and handle body are of unitary construction and formed of a polymeric material, a metallic material or a wood material. Furthermore, a single leg could be used to secure an insert bracket or insert element to the handle body where, for example, the leg was either centered relative to the insert bracket to form a T-shaped profile, or was disposed to one end of the insert bracket to form an L-shaped profile.

FIGS. 4 and 5 illustrate that, when portable barbeque grill unit 10 is oriented in a generally horizontal manner for grilling food therewith, receptacle member 56 is positioned such that insert member 40 of left removable handle 14 is received by receptacle member 56 by upward vertical installation of insert bracket 74 into insert end 72 of receptacle member 56. The rounded profile of retainer lip 66 functions to provide a non-binding entry or lead for installation of insert bracket 74 into receptacle member 56. Furthermore, as shown in FIG. 2, left removable handle 14 is both held within and generally precluded from sliding out of receptacle member 56, at least in part, due to the contact of retainer lip 66 with outer surface 60 such that insert end 72 is substantially closed or sealed. It should be understood, therefore, that the insertion of insert member 40 into receptacle member 56 located on the outer surface 60 of grill body 12 in the manner described above readily enables the attachment of left removable handle 14 to grill body 12.

Figure 6:
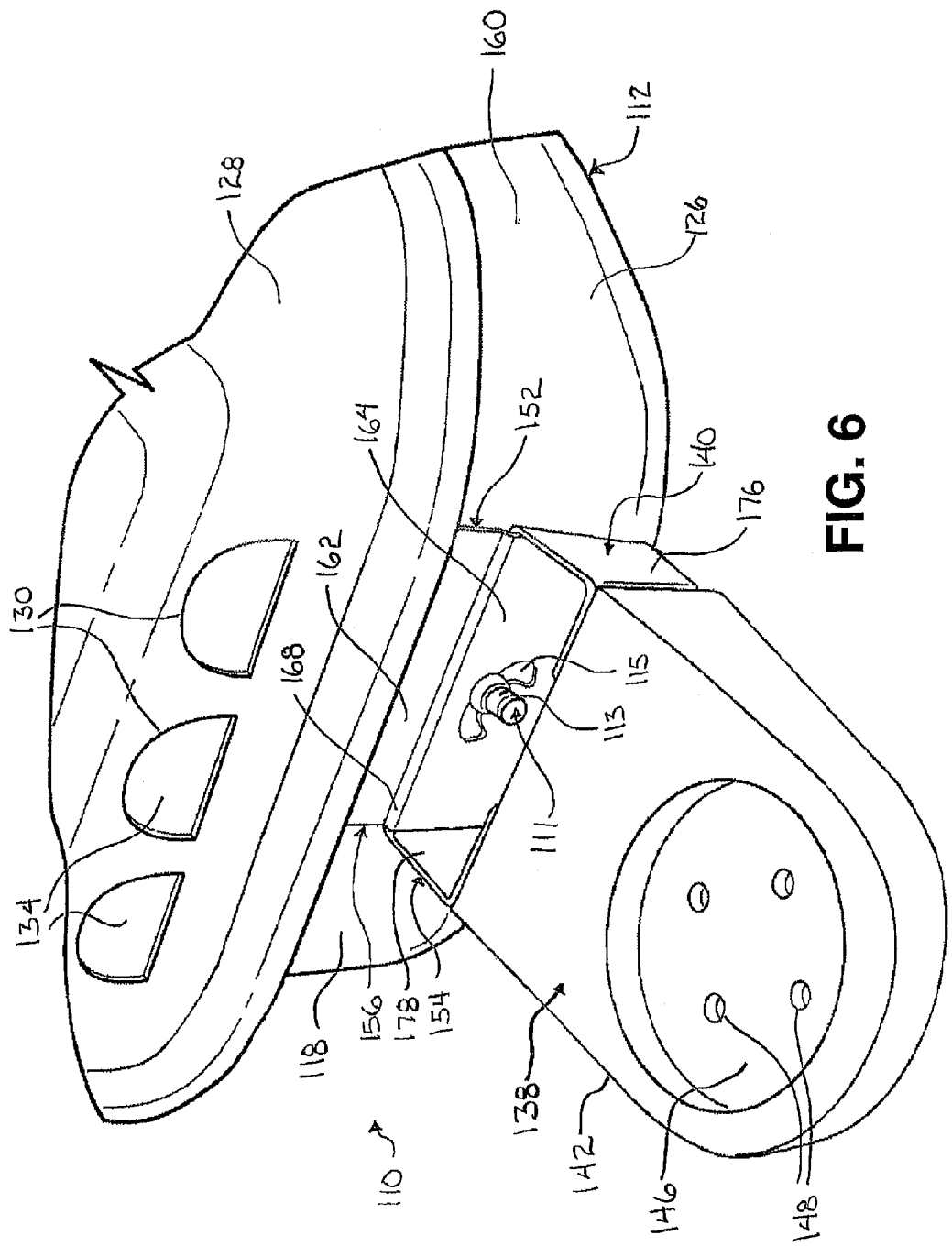
FIG. 6 is a close up front perspective view of an alternative embodiment of a left removable handle attached to a grill body of the present invention.
Figure 7:
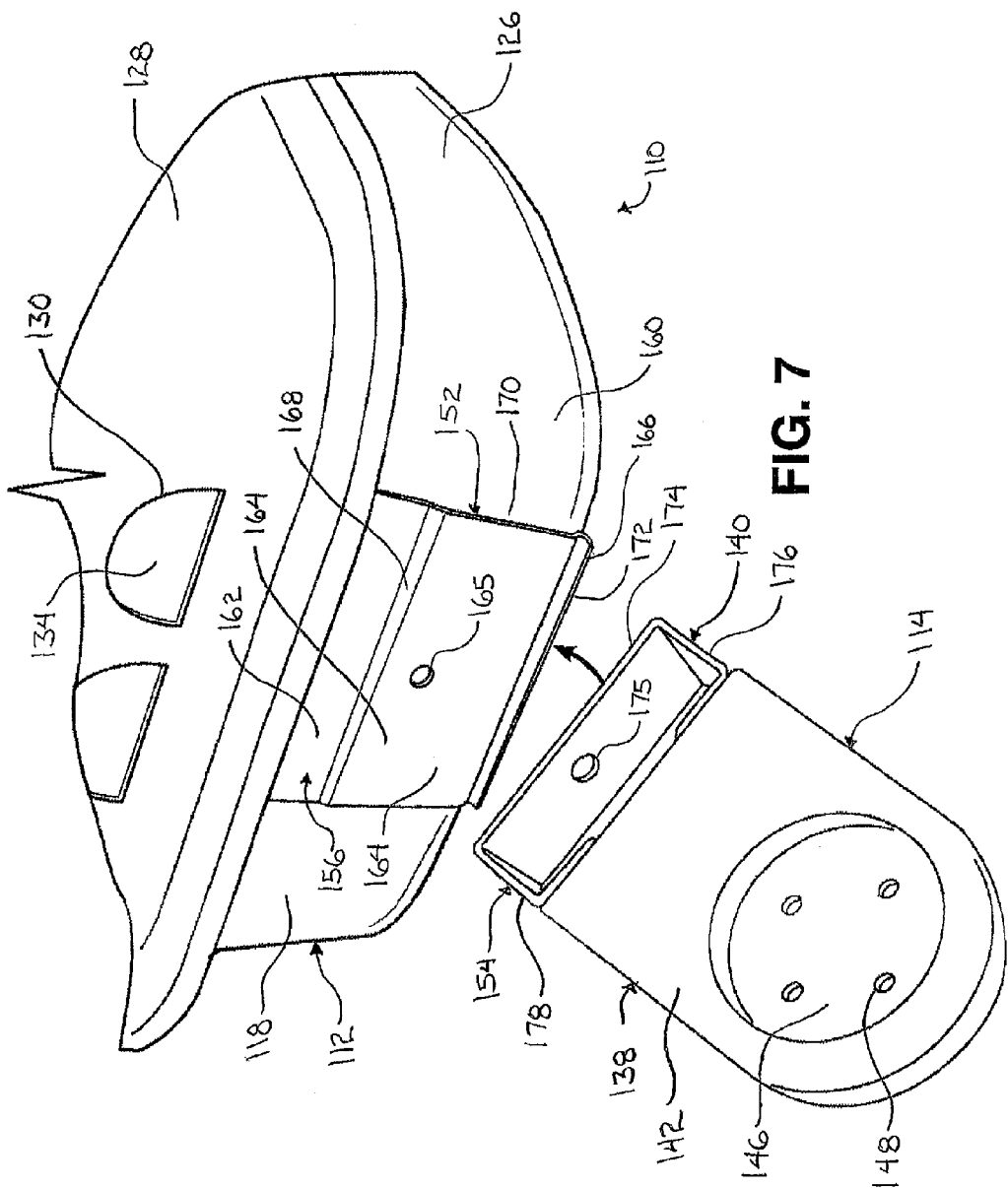
FIG. 7 is a perspective view of the left removable handle removed from the grill body of FIG. 6.

Referring now to FIGS. 6 and 7, an alternative portable barbeque grill unit 110 is illustrated that is of similar construction to the above discussed portable barbeque grill unit 10, where the similar components or elements of portable barbeque grill unit 110 are shown with similar reference numbers as used in FIGS. 1-5 with respect to portable barbeque grill unit 10, but with 100 added to the reference numbers of FIGS. 1-5. It should be understood that, because of the similarity of portable barbeque grill unit 110 to portable barbeque grill unit 10, not all of the specific construction and alternatives of like referenced parts will be discussed in the following discussion of portable barbeque grill unit 110. As illustrated, portable barbeque grill unit 110 includes an alternatively embodied receptacle member or receiver member 156 and insert member or plug member 140 that are adapted to receive a fastener 111. The inclusion of fastener 111 aids in further securing insert member 140 to receptacle member 156 and correspondingly, therefore, securing left removable handle 114 to grill body 112.

In the illustrated embodiment, fastener 111 is of conventional construction and comprises a bolt or screw having threaded shaft 113 and a nut or wing nut 115 adapted to engage shaft 113. FIG. 7 illustrates that insert bracket 174 of insert member 140 includes a hole 175 and that retainer flange 164 of receptacle member 156, correspondingly, includes hole 165, with hole 165 extending through lower section 126 of grill body 112 into interior 134. To install fastener 111, insert bracket 174 is initially slid into receptacle member 156 such that hole 175 of insert bracket 174 is aligned with hole 165. Fastener 111 is then installed from the interior 134 of grill body 112 such that shaft 113 passes through holes 165, 175. Nut 115 may then be threaded onto shaft 113, as by hand.

It should be understood that alternative fasteners and alternatively embodied portable barbeque grills employing fasteners relative to that disclosed in FIGS. 6 and 7 may be used and constructed within the scope of the present invention and still function as intended. For example, two or more fasteners may be used to secure first and second attachment members together. In addition, fasteners constructed as clips, snaps, a shaft adapted to receive a cotter pin, or the like, may be used in place of, or together with, a threaded fastener. A threaded fastener may be installed by being inserted from outside of the grill into the interior of the grill. Furthermore, the grill body could be constructed to include structure for receiving a fastener. For example, a nut could be bonded or welded to the interior of grill body, or the grill body could include an embossed or stamped portion adapted to receive the threads of a threaded fastener or the edges of a snap fitting or the like.

Although the embodiments of FIGS. 3 to 5 and 6 to 7 disclose the receptacle member 56, 156 as being affixed to the grill body 12, 112 and the insert member 40, 140 as being included on the removable handle 14, 114, it should be understood that alternative arrangements may be employed within the scope of the present invention. For example, the disclosed receptacle member may be affixed to the removable handle and the disclosed insert member may be affixed to the grill body.

It should also be understood that alternative first and second coupling or attachment members may be used to attach a removable handle to a grill body within the scope of the present invention. For example, a first or second coupling member may be constructed as a generally cylindrical tube or pipe and the mating coupling member constructed as a generally cylindrical rod or shaft that may be inserted into the tube or pipe. A first and second coupling member may also be constructed as a ball and socket type connection with either the ball or socket being affixed to the outer surface of the grill body and the removable handle including the corresponding member. Furthermore, instead of the receptacle member receiving the insert member by generally upward vertical installation as described above, an alternative receptacle or receiver member could be constructed to receive an insert or plug member in a generally horizontal or downward vertical installation, or at an angle relative to a vertical or horizontal orientation.

Still further, two or more receptacle members may be used to receive a single insert member, or a single handle may be securable to a grill body where the handle includes two or more insert members adapted for insertion into an equal number of receptacle members on the grill body. Correspondingly, the removable handles may be alternatively configured relative to left and right removable handles disclosed above. For example, a removable handle may be structured as a single post, or as a device having a conventional generally U-shaped construction with three sections that include a grasping section that is adapted to be generally parallel to the sides of the grill when attached and two extending sections projecting generally perpendicularly from the grasping section and including insert members for attachment to one or more receptacle members.

It should also be appreciated that a receptacle member and insert member adapted to attach a removable handle having a handle body constructed as a gas support arm may include a hole or cutout to receive or form a clearance for the fuel supply connector used to supply the grill body with cooking fuel.

In addition to alternative constructions for first and second coupling or attachment members, it should also be understood that other components or structures of the cooking equipment apparatus of the present invention may be alternatively configured and still function as a cooking equipment apparatus having one or more selectively removable handles to thereby provide a more compact form for storing, shipping, and the like. For example, although in the illustrated embodiment the grill body 12, 112 is roughly rectangular with rounded corners and edges and a non-linear front side 80, 180, alternative grill bodies could be formed to be generally square, circular, oval, or the like, and may or may not include correspondingly configured support stands for holding such grill bodies. The grill body may also alternatively not include a hinged connection of the lid about the lower section, in which case the lid would be lifted to open the grill and, in such an alternative, a handle on the top of the lid top would be preferred.

Furthermore, although the embodiment illustrated in FIG. 1 discloses the use of a support stand 22 for supporting the grill body 12, it should also be understood that a cooking equipment apparatus having at least one removable handle could be constructed to not require a support stand. For example, a grill body may be constructed to include legs for supporting the grill body on a generally horizontal surface, with the legs being pivoting legs or permanently extended legs attached to the bottom or sides of the lower section of the grill body. Still further, the cooking equipment apparatus of the present invention having one or more selectively removable handles need not be a portable barbeque grill unit, in which case the removable handles would be particularly beneficial for shipping the cooking equipment apparatuses from the manufacturer to a wholesaler or retail distributor.

Therefore, the ability to readily detach the removable handle provides a barbeque grill unit that may be disassembled into a compact form and reduces handling costs associated with the supply chain of the barbeque grill unit, such as shipping and storage costs, thus providing a competitive advantage to the barbeque grill unit supplier. Furthermore, the readily assembled and disassembled removable handle and grill body of the present invention provide a convenient barbeque grill unit for individuals desiring to transport the grill unit for use in locations remote from normal residential areas, such as individuals engaging in camping and picnicking. The grill may be stored and transported in a disassembled fashion in a carrying case, a trunk of a car, or a recreational vehicle, or the like, while enabling more room for other items. The readily assembled removable handle and grill body also promote higher customer satisfaction as a result of the ease of assembly that does not require complicated and excessive tools.

The above is a description of the preferred embodiments. One skilled in the art will recognize that changes and modifications may be made without departing from the spirit of the disclosed invention, the scope of which is to be determined by the claims which follow and the breadth of interpretation that the law allows.

The embodiments of the invention in which an exclusive property right or privilege are claimed are defined as follows:

1. A cooking equipment apparatus comprising:
   a grill body, said grill body having an outer surface and an interior;
   a first removable handle adapted for selective attachment with said grill body to facilitate handling of said cooking equipment apparatus; and
   first and second coupling members;
   said first coupling member being located on said outer surface of said grill body and said second coupling member being located on said handle, said first and second coupling members adapted to being selectively engaged such that said handle is attached with said grill body, wherein said first coupling member is a receptacle member and said second coupling member is an insert member, and wherein said receptacle member includes a retainer flange, said retainer flange being disposed away from said outer surface such that said retainer flange and said outer surface define a retainer gap, said retainer gap being adapted to receive at least a portion of said insert member, and wherein said retainer flange further includes a retainer lip, said retainer lip extending from said retainer flange into said retainer gap and being adapted to retain at least a portion of said insert member when received within said retainer gap, and wherein said first removable handle includes a handle body affixed to said insert member, said handle body projecting laterally from said grill body when said first removable handle is attached to said grill body, said handle body having a portion including one of a beverage detent and a gas regulator control valve knob, wherein said beverage detent is defined as a cavity on said handle body and said gas regulator control valve knob is rotatably mounted to said handle body.

2. The cooking equipment apparatus of claim 1, wherein said receptacle member is adapted to receive said insert member by vertical upward insertion of said insert member into said receptacle member when said cooling equipment apparatus is oriented for use.

3. The cooking equipment apparatus of claim 1, wherein said receptacle member includes an attachment flange, and wherein said attachment flange is secured to said outer surface such that said receptacle member is secured to said grill body.

4. The cooking equipment apparatus of claim 1, wherein said insert member comprises an insert bracket and at least one leg, said leg being adapted to affix said insert bracket to said handle body, and said receptacle member being adapted to receive said insert bracket.

5. The cooking equipment apparatus of claim 4, wherein said insert member includes two legs.

6. The cooking equipment apparatus of claim 1, further including a fastener, said fastener being adapted to fixedly secure said second coupling member to said first coupling member.

7. The cooking equipment apparatus of claim 6, wherein said fastener is adapted to extend through said first and second coupling members.

8. The cooking equipment apparatus of claim 6, wherein said fastener is a threaded fastener.

9. The cooking equipment apparatus of claim 1, wherein said grill body comprises an upper section and a lower section, and wherein said first coupling member is disposed on said lower section.

10. The cooking equipment apparatus of claim 1, wherein said grill body includes a plurality of sides, and wherein said first coupling member is disposed on one of said sides.

11. The cooking equipment apparatus of claim 1, further including a support stand, said support stand being adapted to hold said grill body, said support stand including an offset region within which said first removable handle is positioned when said first removable handle is attached to said grill body and said grill body is held by said support stand.

12. The cooking equipment apparatus of claim 1, further including third and fourth coupling members and a second removable handle, said third coupling member being located on said outer surface of said grill body and said fourth coupling member being located on said second handle, said third and fourth coupling members adapted to being selectively engaged such that said second handle is attached with said body.

13. A cooking equipment apparatus comprising:
a grill body, said grill body having an outer surface and an interior;
at least one removable handle adapted for selective engagement with said grill body to facilitate handling of said cooking equipment apparatus, said at least one removable handle including a handle body, said handle body projecting laterally from said grill body when said removable handle is secured to said grill body, said handle body having a portion including one of a beverage detent and a gas regulator control valve knob, wherein said beverage detent is defined as a cavity on said handle body and said gas regulator control valve knob is rotatably mounted to said handle body; and
first and second attachment members;
said first attachment member being located on said outer surface of said grill body and said second attachment member being located on said handle, said second attachment member adapted to being insertably received by said first attachment member such that said handle is engaged with said grill body, said cooking equipment apparatus further including a support stand, said support stand being adapted to hold said grill body, said support stand including an offset region within which said at least one removable handle is positioned when said at least one removable handle is attached to said grill body and said grill body is held by said support stand.

14. The cooking equipment apparatus of claim 13, wherein said first attachment member is adapted to receive said second attachment member by vertical upward insertion of said second attachment member into said first attachment member when said cooking apparatus is oriented for use.

15. The cooking equipment apparatus of claim 13, wherein said first attachment member is a receiver member and said second attachment member is a plug member, and wherein said plug member is adapted for insertion into said receiver member.

16. The cooking equipment apparatus of claim 15, wherein said receiver member includes a retainer gap, said retainer gap being adapted to receive at least a portion of said plug member.

17. The cooking equipment apparatus of claim 15, wherein said plug member is affixed to said handle body.

18. The cooking equipment apparatus of claim 13, said support stand being adapted to hold said grill body with said support stand being selectively detachably mountable to a generally vertical surface and independently and alternatively supportable on a generally horizontal surface.

19. The cooking equipment apparatus of claim 13, further including a plurality of removable handles.

20. A cooling equipment apparatus comprising:
a grill body, said grill body having an outer surface and a receptacle member disposed on said outer surface; and
at least one removable handle adapted for selective engagement with said grill body to facilitate handling of said cooking equipment unit, said handle including a handle body and an insert member affixed to said handle body, said handle body having a portion including one of a beverage detent and a gas regulator control valve knob, wherein said beverage detent is defined as a cavity on said handle body and said gas regulator control valve knob is rotatably mounted to said handle body;
said receptacle member being adapted to receive said insert member such that said handle is attached with said grill body, wherein said insert member includes an insert element, a first leg, and a second leg, said first and second legs being affixed to and extending from said handle body with said insert element extending between said first and second legs distal from said handle body, and wherein said insert element is received by said receptacle member to attach said handle to said grill body.

21. The cooking equipment apparatus of claim 20, wherein said receptacle member is adapted to receive said insert element by vertical upward insertion of said insert element into said receptacle member when said cooking equipment apparatus is oriented for use.

22. The cooking equipment apparatus of claim 20, wherein said receptacle member includes a retainer gap and a retainer lip, said retainer gap being adapted to receive at least a portion of said insert element with said retainer lip retaining said insert element within said retainer gap.

23. The cooling equipment apparatus of claim 20, further including a support stand, said support stand being adapted to hold said grill body, said support stand including an offset region within which said first removable handle is positioned when said first removable handle is attached to said grill body and said grill body is held by said support stand.

* * * * *